(12) United States Patent
Fujita

(10) Patent No.: US 8,998,437 B2
(45) Date of Patent: Apr. 7, 2015

(54) LIGHT EMITTING COMPONENT BOARD GROUP, LIGHT EMITTING DEVICE AND LIQUID CRYSTAL DISPLAY DEVICE

(75) Inventor: Tsukasa Fujita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 158 days.

(21) Appl. No.: 13/816,034

(22) PCT Filed: Jul. 5, 2011

(86) PCT No.: PCT/JP2011/065361
§ 371 (c)(1),
(2), (4) Date: Mar. 18, 2013

(87) PCT Pub. No.: WO2012/020616
PCT Pub. Date: Feb. 16, 2012

(65) Prior Publication Data
US 2013/0176710 A1 Jul. 11, 2013

(30) Foreign Application Priority Data
Aug. 9, 2010 (JP) ................................. 2010-178535

(51) Int. Cl.
*G09F 13/08* (2006.01)
*F21V 23/00* (2006.01)
*H05B 33/08* (2006.01)
*G02F 1/1335* (2006.01)

(52) U.S. Cl.
CPC .......... *F21V 23/001* (2013.01); *H05B 33/0803* (2013.01); *H05B 33/0869* (2013.01); *G02F 1/1336* (2013.01); *G02F 1/133603* (2013.01)

(58) Field of Classification Search
CPC .................................................. F21V 23/001

USPC .................................................. 362/97.3, 367
See application file for complete search history.

(56) References Cited

U.S. PATENT DOCUMENTS

| 2005/0041423 A1* | 2/2005 | Janning ......................... 362/227 |
| 2007/0115671 A1 | 5/2007 | Roberts et al. |
| 2010/0103649 A1* | 4/2010 | Hamada ....................... 362/97.1 |

FOREIGN PATENT DOCUMENTS

| JP | 2009-016093 A | 1/2009 |
| JP | 2009-016549 A | 1/2009 |
| JP | 2009-516358 A | 4/2009 |

OTHER PUBLICATIONS

International Search Report corresponding to PCT/JP2011/065361, dated Oct. 18, 2011.

\* cited by examiner

*Primary Examiner* — Evan Dzierzynski
(74) *Attorney, Agent, or Firm* — Lowe Hauptman & Ham, LLP

(57) ABSTRACT

A light emitting component board group includes first and second light emitting component boards that are rectangular in shape. The first light emitting component board has first short and long sides, and includes a first input connector provided on one of the first short sides, a first light emitting component group, a first output connector provided on another one of the first short sides. The second light emitting component board has second short and long sides, is arranged in adjacent to the first light emitting component board, and includes a second output connector provided close to one of the second short sided that is close to the one of the first short sides, a second light emitting component group, a second input connector provided close to another one of the short sides that is close to the other one of the first short sides.

11 Claims, 6 Drawing Sheets

LIGHT EMITTING COMPONENT BOARD GROUP, LIGHT EMITTING DEVICE AND LIQUID CRYSTAL DISPLAY DEVICE

RELATED APPLICATIONS

The present application is a National Phase of International Application Number PCT/JP2011/065361, filed Jul. 5, 2011, and claims priority from Japanese Application Number 2010-178535, filed Aug. 9, 2010.

TECHNICAL FIELD

The present invention relates to a light emitting component board group, a light emitting device, and a liquid crystal display device.

BACKGROUND ART

Light emitting devices including semiconductor components such as LEDs (light emitting diodes) as a light emitting component have been used widely. Such a light emitting device includes therein a plurality of light emitting component boards each including the light emitting components. Such a light emitting device has been researched to be applied to a power source for a liquid crystal backlight because such a light emitting device is excellent in initial driving properties and stands against vibration or repetition of ON/OFF lighting operations.

FIG. 5 illustrates one example of a circuit configuration of a conventional light emitting component board 300. According to the conventional light emitting component board 300, a power source terminal D that supplies a drive voltage to the light emitting components 304 and a GND terminal are connected to one connector 302. Thus, the power source terminal D and the GND terminal G that have great potential difference are arranged close to each other. Therefore, if the power source terminal D and the GND terminal G short out due to tracking, market troubles such as fire may be caused, and a detection circuit that detects occurrence of short out may be provided for safety design (refer to Patent Document 1).
[Patent Document 1] Japanese Unexamined Patent Publication No. 2009-16459

Problem to be Solved by the Invention

The terminals having great potential difference are arranged close to each other, and therefore, occurrence of short out may occur. Occurrence of short out is less likely to occur with the arrangement illustrated in FIG. 6. In FIG. 6, two connectors 312, 314 are arranged in two different positions on the light emitting component board 310 such that each of the power source terminal D and the GND terminal G is connected to a different connector.

However, if the connectors are arranged as is in FIG. 6, noise occurring due to the drive voltage may increase. If the light emitting component board 310 illustrated in FIG. 6 is connected to the power source supplier that applies a drive voltage, at least one 314 of the connectors of the light emitting component board 310 is arranged to be away from the power source supplier. Therefore, it is necessary to connect the connector 314 to the power source supplier by a cable 316. The cable 316 may not be wired around to the vicinity of the light emitting component board 310 according to the configuration of the light emitting device, and this may increase an area (a loop area) defined by the light emitting component board and the cable 316. As a result, a noise is likely to occur in a closed circuit configured by the light emitting component board 310 and the cable 316 and this may deteriorate the light emission condition and cause flicker in the light emitting component 304. A technology is desired such that the wiring problem that may cause market troubles and deterioration of the light emission condition of the light emitting component are less likely to be caused.

DISCLOSURE OF THE PRESENT INVENTION

The present technology was accomplished in view of the above circumstances. It is an object of the present technology to provide a technology with which the wiring problems and deterioration of the light emission condition are less likely to occur.

Means for Solving the Problem

To solve the above problem, a light emitting component board group including a plurality of light emitting component boards each of which has a first direction and a second direction and is formed in an elongated shape in the second direction, and the light emitting component board group includes a first light emitting component board and a second light emitting component board. The first light emitting component board includes a first circuit including a first input connector, a first light emitting component group, and a first output connector that are connected to each other in this order, and the first input connector is provided on one end of the second direction, and the first output connector is provided on another end of the second direction. The second light emitting component board is arranged in adjacent to the first light emitting component board in the first direction, and the second light emitting component board includes a second circuit including a second output connector, a second light emitting component group, and a second input connector that are connected to each other in this order, and the second output connector is provided on an end in the second direction corresponding to the one end, and the second input connector is provided on an end in the second direction corresponding to the other end.

In the light emitting component board group, two connectors formed on each of the light emitting component boards are provided on different end portions in the second direction that is an elongated direction compared to the first direction. Accordingly, wiring problems are less likely to occur. The first light emitting component board and the second light emitting component board are arranged in adjacent to each other in the first direction. The first output connector and the second input connector that are on the same ends in the second direction are connected to each other to form a first closed circuit with the first circuit and the second circuit. This reduces a loop area of the first closed circuit. Accordingly, noise is less likely to occur in the first closed circuit and deterioration of light emission condition is less likely to occur in the first light emitting component group and the second light emitting component group included in the first closed circuit.

The first circuit may be arranged on the first light emitting component board close to the second light emitting component board in the first direction. The second circuit may be arranged on the second light emitting component board close to the first light emitting component board in the first direction. Such a light emitting component board group reduces a loop area of a first closed circuit and noise occurring in the first closed circuit is less likely to be caused.

The light emitting component board group may further include a third light emitting component board provided in adjacent to the second light emitting component board in the first direction. The second light emitting component board may include a third circuit that is insulated from the second circuit and include a third output connector, a third light emitting component group, and a third input connector that are connected to each other in this order. The third output connector may be provided on an end in the second direction corresponding to the one end, and the third input connector may be provided on an end in the second direction corresponding to the other end. The third light emitting component board may include a fourth circuit including a fourth input connector, a fourth light emitting component group, and a fourth output connector that are connected to each other in this order. The fourth input connector may be provided on an end in the second direction corresponding to the one end, and the fourth output connector may be provided on an end in the second direction corresponding to the other end. A first forward voltage drop value of the first light emitting component group may be substantially equal to a fourth forward voltage drop value of the fourth light emitting component group, and a second forward voltage drop value of the second light emitting component group may be substantially equal to a third forward voltage drop value of the third light emitting component group.

In the light emitting component board group, the fourth output connector and the third input connector are connected to each other to configure a second closed circuit with using the third circuit and the fourth circuit. According to such a light emitting component board group, the first closed circuit and the second closed circuit are configured with using the second light emitting component board. This reduces the number of light emitting component boards that are required for forming a plurality of closed circuits. The forward voltage drop value is set in each of the light emitting component group. If an equal voltage is applied to each of the first closed circuit and the second closed circuit, a voltage of terminals each connected to each of the second input connector and the third input connector is equal. Therefore, if short out occurs between the terminals that are connected to the second input connector and the third input connector that are arranged in adjacent to each other, market problems such as fire are less likely to be caused.

The second output connector and the third output connector may be configured with one common connector. This simplifies a configuration of the light emitting component board group and reduces a cost of the light emitting component board group.

The first light emitting component board and the third light emitting component board may be configured with one common light emitting component board. The first circuit may be insulated from the fourth circuit. With this light emitting component board group, the first light emitting component board and the second light emitting component board configure a first closed circuit and a second closed circuit. This effectively reduces the number of light emitting component boards that are required for forming a plurality of closed circuits.

The light emitting component board group may further include a fourth light emitting component board arranged in adjacent to the first light emitting component board in the first direction. The first light emitting component board may include a fifth circuit that is insulated from the first circuit and includes a fifth input connector, a fifth light emitting component group, and a fifth output connector that are connected to each other in this order. The fifth input connector may be provided on an end in the second direction corresponding to the one end, and the fifth output connector may be provided on an end in the second direction corresponding to the other end. The fourth light emitting component board may include a sixth circuit including a sixth output connector, a sixth light emitting component group, and a sixth input connector that are connected to each other in this order. The sixth output connector may be provided on an end in the second direction corresponding to the one end, and the sixth input connector may be provided on one end in the second direction corresponding to the other end. A first forward voltage drop value of the first light emitting component group may be substantially equal to a fifth forward voltage drop value of the fifth light emitting component group, and a second forward voltage drop value of the second light emitting component group may be substantially equal to a sixth forward voltage drop value of the sixth light emitting component group.

In the light emitting component board group, the fifth output connector and the sixth input connector are connected to each other to configure a third closed circuit with using the fifth circuit and the sixth circuit. According to such a light emitting component board group, the first closed circuit and the third closed circuit are configured with using the first light emitting component board. This reduces the number of light emitting component boards that are required for forming a plurality of closed circuits. The forward voltage drop value is set in each of the light emitting component group. If an equal voltage is applied to each of the first closed circuit and the third closed circuit, a voltage of terminals each connected to each of the first output connector and the fifth output connector is equal. Therefore, if short out occurs between the terminals that are connected to the first output connector and the fifth output connector that are arranged in adjacent to each other, market problems such as fire are less likely to be caused.

The first input connector and the fifth input connector may be configured with one common connector. This simplifies a configuration of the light emitting component board group and reduces a cost of the light emitting component board group.

The second light emitting component board and the fourth light emitting component board may be configured with one common light emitting component board. The first circuit may be insulated from the fifth circuit. With such a light emitting component board group, the first light emitting component board and the second light emitting component board configure a first closed circuit and a third closed circuit. This reduces the number of light emitting component boards that are required for forming a plurality of closed circuits.

The present technology may be applied to a light emitting device including the light emitting component board group. A light emitting device of the present technology includes one of the above-described light emitting component board groups, and a power source supplier connected to the light emitting component board group and configured to apply a drive voltage to each of the light emitting component groups. According to such a light emitting device, wiring problems are less likely to occur in the light emitting component board group of the light emitting device and deterioration of light emission condition in the light emitting device is less likely to occur.

A light emitting component included in each light emitting component group is an LED. In the light emitting device including the LEDs, wiring problems and deterioration of light emission condition are less likely to occur.

The light emitting device may be a backlight for a liquid crystal display. With this configuration, the light emitting device in which market problems and deterioration of light emission condition are less likely to occur is used as a backlight for a liquid crystal display. Therefore, short out is less likely to occur due to tracking and the light emission condition is stable in the backlight.

The present technology may be applied to a liquid crystal display device including the light emitting device including the above light emitting component board group as a backlight. The light emitting device includes a liquid crystal panel configured to display an image, and a backlight irradiating the liquid crystal panel with light. The backlight is the above described light emitting device. With this configuration, the liquid crystal display device includes the light emitting device as the backlight in which market problems and deterioration of light emission condition are less likely to occur. Therefore, short out is less likely to occur due to tracking and the light emission condition is stable in the liquid crystal display device.

Advantageous Effect of the Invention

According to the present technology, in a light emitting component board group including a plurality of light emitting component boards and in a device including the light emitting component board group, wiring problems and deterioration of the light emission condition are less likely to occur.

BEST MODE FOR CARRYING OUT THE INVENTION

A first embodiment of the present technology will be explained with reference to the drawings. In the following embodiments, an LED backlight system 18 (one of examples of a light emitting device, and referred to as an LED backlight) that is used as a backlight of a liquid crystal display device 10 is used as a light emitting device. However, the present technology is not limited thereto but may be applied to a light emitting device that is used as various lighting devices or display devices.

1. Configuration of Liquid Crystal Display Device

A configuration of the liquid crystal display device 10 will be explained with reference to FIG. 1.

Figure 1:
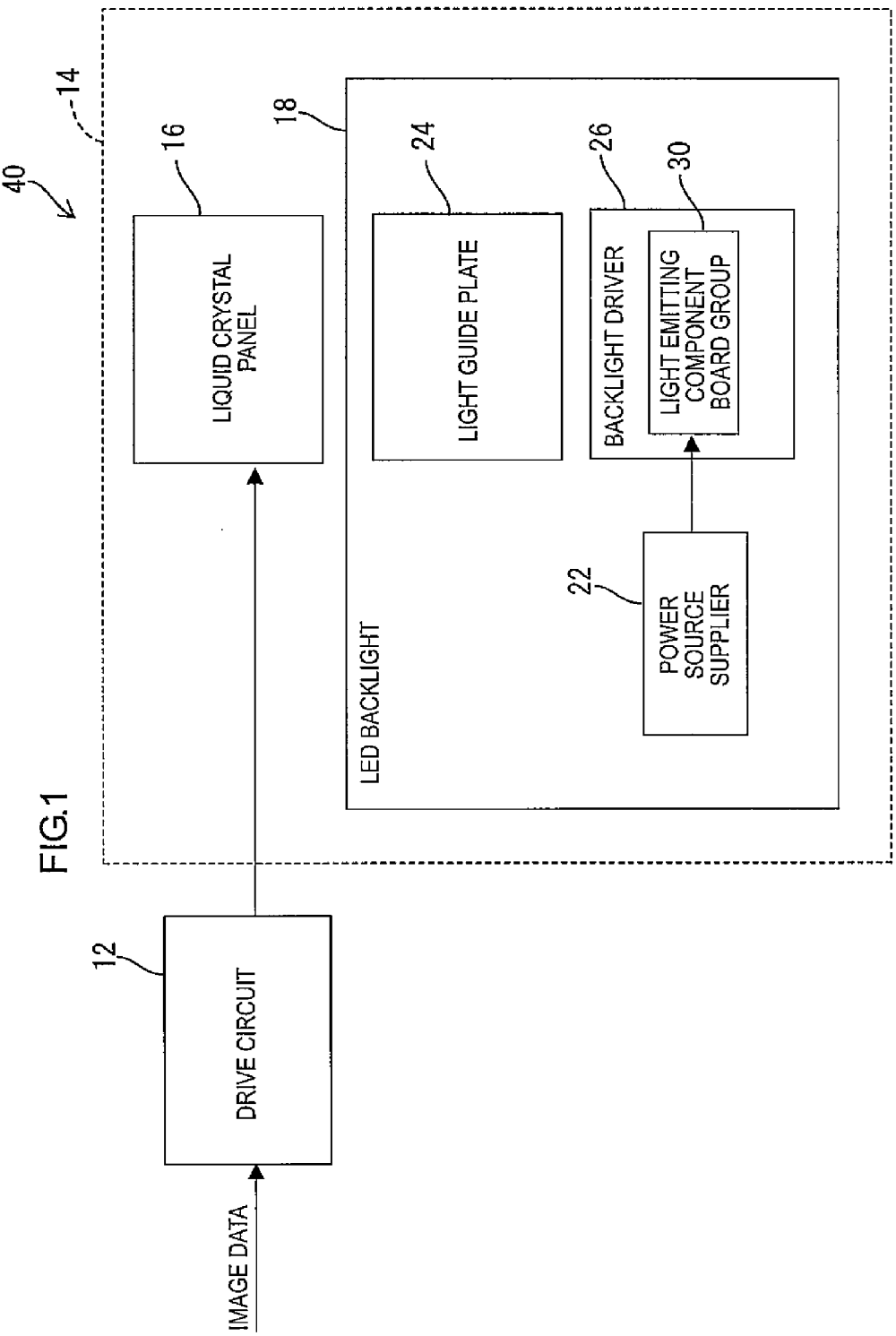
FIG. 1 is a block diagram illustrating a configuration of a liquid crystal display device.

As illustrated in FIG. 1, the liquid crystal display device 10 includes a drive circuit 12 and display device 14. The display device 14 includes a liquid crystal panel 16 and an LED backlight 18.

The drive circuit 12 transfers image data supplied from an external device (not illustrated) to the liquid crystal panel 16 and displays images on the liquid crystal panel 16. The LED backlight 18 is arranged on a rear-side surface of the liquid crystal panel 16. The LED backlight 18 includes a power source supplier 22, a light guide plate 24, and a backlight driver 26. The backlight driver 26 includes a light emitting component board group 30 including LEDs 20 that are light sources (refer to FIG. 2). The power source supplier 22 is connected to the light emitting component board group 30. The power source supplier 22 applies a drive voltage to the LEDs 20 included in the light emitting component board group and controls a current amount flowing in the LEDs 20 to control an amount of light entering the light guide plate 24 from the LEDs 20. The light guide plate 24 is arranged to correspond to the liquid crystal panel 16 and guides the light entering from the LEDs 20 to the liquid crystal panel 16.

2. Configuration of Backlight Driver

Figure 2:
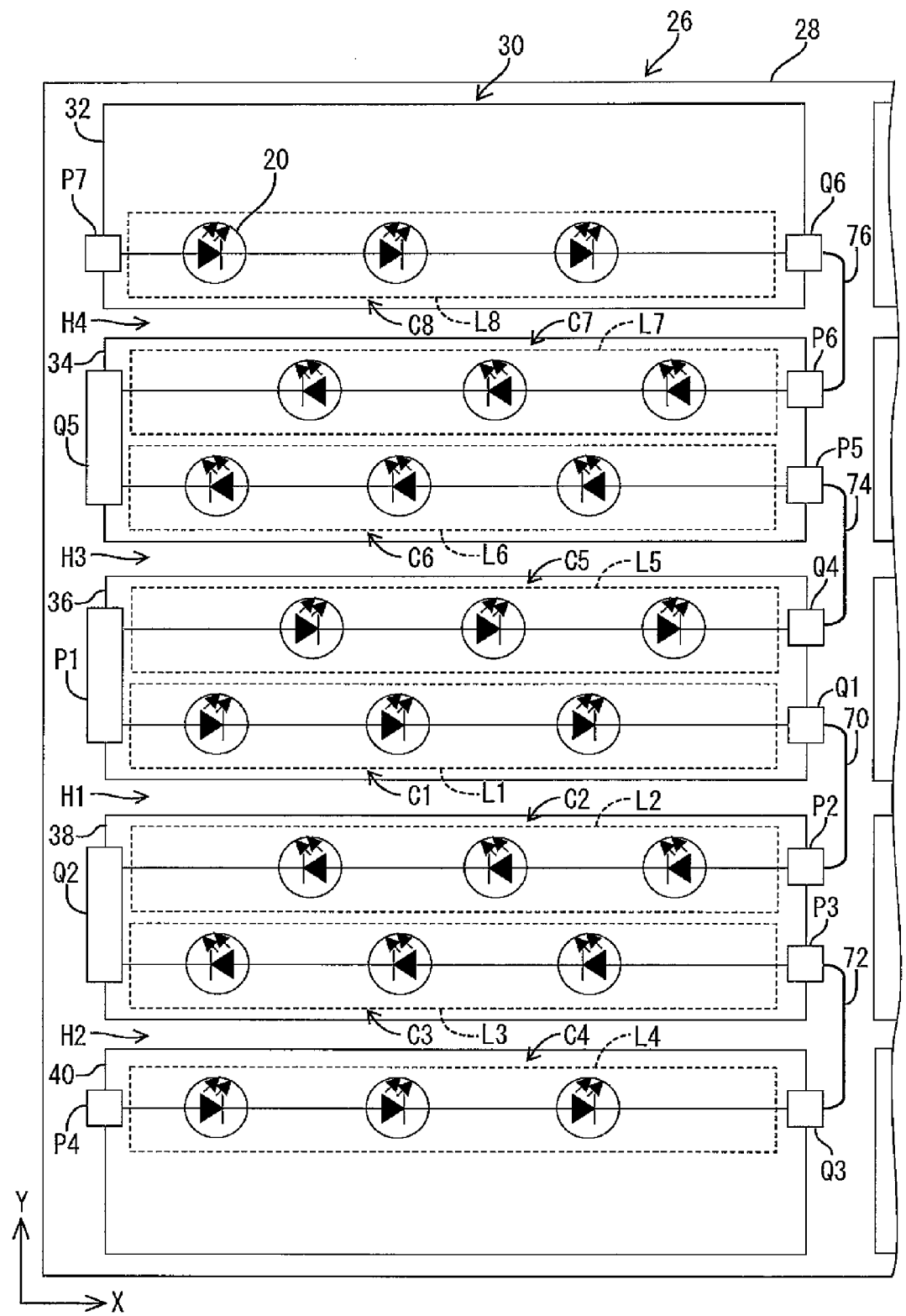
FIG. 2 is a view illustrating a configuration of a backlight driver 26.

As illustrated in FIG. 2, the backlight driver 26 includes a plurality of light emitting component boards 32-40 that are arranged in adjacent to each other in a container 28. The light emitting component boards 32-40 configure a light emitting component board group 30. In FIG. 2, an X-axis and a Y-axis are illustrated. The light emitting component boards 32-40 are arranged along the Y-axis direction and another board group similar to the board group 30 including the light emitting component boards 32-40 are arranged in adjacent to each other along the X-axis direction. As a whole, the light emitting component boards are arranged in a matrix. Each of the light emitting component boards is formed in a rectangular shape seen from an upper-surface side, and the light emitting component boards are arranged such that each long-side is parallel to the X-axis and each short side is parallel to the Y-axis. The long side corresponds to the X-axis and the short side corresponds to the Y-axis. Each of the light emitting component boards includes an input connector, a plurality of LEDs 20 (an example of the light emitting component group), and an output connector. In the following, a left end portion of each light emitting component board in the long-side direction (an example of a second direction) is referred to as a left end and a right end portion thereof is referred to as a right end.

A first light emitting component board 36 includes a high pressure side connector P1 (an example of a first input connector), an LED group L1 and a low pressure side connector Q1 (an example of a first output connector). The high pressure side connector P1 is arranged on the left end of the first light emitting component board 36 and the low pressure side connector Q1 is arranged on the right end of the first light emitting component board 36. The high pressure side connector P1 is connected to the low pressure side connector Q1 by a wiring 52, and the LEDs 20 are arranged on the wiring 54. Namely, the high pressure side connector P1, the LED group L1 and the low pressure side connector Q1 are connected to each other in this order by the wiring 52 and this configures a first circuit C1.

A second light emitting component board 38 includes a high pressure side connector P2 (an example of a second input connector), an LED group L2, and a low pressure side connector Q2 (an example of a second output connector). The high pressure side connector P2 is arranged on the right end of the second light emitting component board 38. Namely, the high pressure side connector P2 is arranged on the second light emitting component board 38 on the same side end in the long side direction as the low pressure side connector Q1 arranged on the first light emitting component board 36. The low pressure side connector Q2 is arranged on the left end of the second light emitting component board 38. Namely, the low pressure side connector Q2 is arranged on the second light emitting component board 38 on the same side end in the long side direction as the high pressure side connector P1 arranged on the first light emitting component board 36. The high pressure side connector P2 is connected to the low pressure side connector Q2 by the wiring 54 and the LEDs 20 are arranged on the wiring 54. The high pressure side connector P2, the LED group L2, and the low pressure side connector Q2 are connected by the wiring 54 in this order. This configures a second circuit C2.

The low pressure side connector Q1 is connected to the high pressure side connector P2 by a cable 70. The first circuit C1, the cable 70, and the second circuit C2 configure a first closed circuit H1 that lights on the LED group L1 and the LED group L2. The first circuit C1 is arranged close to the second light emitting component board 38 in the short-side direction of the first light emitting component board 36. The second circuit C2 is arranged close to the second light emitting component board 36 in the short-side direction of the first light emitting component board 36. This reduces a loop area of the first closed circuit H1.

The second light emitting component board 38 includes a high pressure side connector P3 (one of a third input connector) and a LED group L3. The high pressure side connector P3, the LED group L3, and the low pressure side connector Q2 configure a third circuit C3. The second circuit C2 and the third circuit C3 are arranged along the short-side direction (one example of a first direction) of the second light emitting component board 38. The second circuit C2 and the third circuit C3 are commonly connected to the low pressure side connector Q2. The second circuit C2 and the third circuit C3 are arranged such that a current flows in each of the second circuit C2 and the third circuit C3 in a same direction (toward a left side in the drawing) and they are insulated from each other. The LEDs 20 included in the LED group L2 and the LEDs 20 included in the LED group L3 are arranged indifferent positions on the second light emitting component board 38 in the long-side direction and in the short-side direction.

A third light emitting component board 40 includes a high pressure side connector p4 (one example of a fourth input connector), an LED group L4, and a low pressure side connector Q3 (one example of a fourth output connector). The high pressure side connector P4, the LED group L4, and the low pressure side connector Q3 configure a fourth circuit C4. The low pressure connector Q3 is connected to the high pressure side connector P3 by a cable 72. Namely, the fourth circuit C4, the cable 72, and the third circuit C3 configure a second closed circuit H2 that lights on the LED group L4 and the LED group L3.

The first light emitting component board 36 includes a low pressure side connector Q4 (one example of a fifth input connector) and a LED group L5, and the high pressure side connector P1, the LED group L5, and the low pressure side connector Q4 configure a fifth circuit C5. Namely, the first circuit C1 and the fifth circuit C5 are arranged along the short-side direction of the first light emitting component board 36. The first circuit C1 and the fifth circuit C5 are commonly connected to the high pressure side connector P1. The first circuit C1 and the fifth circuit C5 are arranged such that a current flows in each of the first circuit C1 and the fifth circuit C5 in a same direction (toward a right side in the drawing) and they are insulated from each other.

A fourth light emitting component board 34 includes a high pressure side connector P5 (one example of the sixth input connectors), an LED group L6, and a low pressure side connector Q5 (one example of the sixth output connector). The high pressure side connector P5, the LED group L6, and the low pressure side connector Q5 configure a sixth circuit C6.

The low pressure side connector Q4 is connected to the high pressure side connector P5 by a cable 74. Namely, the fifth circuit C5, the cable 74, and the sixth circuit C6 configure a third closed circuit H3 that lights on the LED group L5 and the LED group L6.

Numerals are applied to other light emitting component board 32 and the circuits C7, C8 in FIG. 2, and each of other light emitting component board 32 and the circuits C7, C8 has a configuration same as the above described ones and will not be explained.

3. Driving of LED Backlight

In the LED backlight 18, in response to supply of image data from the external device, the power source supplier 22 applies a drive voltage to the light emitting board group 30. The power supplier 22 is connected to the high pressure side connectors P1, P4 of the light emitting component board group 30. The drive voltage is applied to the light emitting component board group via the connectors. The power source supplier 22 is connected to the low pressure side connectors Q2, Q5 via a grounded voltage. As a result, a drive voltage common to each of the closed circuits H1 to H3.

The power source supplier 22 controls an amount of current flowing in each of the closed loops H1 to H3 to be equal to each other. In each of the circuits C1 to C6, the number of LEDs 20 included in each LED group L is set to be equal. Therefore, if a value of a forward voltage drop caused in each of the LED groups L1 to L6 is V1 to V6, respectively, each of the forward voltage drop values V1 to V6 is set to be substantially equal to each other ($V1 \approx V2 \approx V3 \approx V4 \approx V5 \approx V6$). The expression of "substantially equal to" is used with considering variations caused between the LEDs 20 and if the variations between the LEDs 20 is not necessary to be considered, each of the forward voltage drop value V1 to V6 is set to be equal to each other.

In the LED backlight 18, if the drive voltage is applied from the power supplier 22, a substantially equal voltage is applied to the terminal connected to each of the high pressure side connectors P2, P3, and a substantially equal voltage is applied to the terminal of the wiring connected to the low pressure side connectors Q1, Q4. Each of these voltages is set to be a voltage substantially half of the drive voltage. Accordingly, the LEDs 20 included in the LED groups L1 to L6 of each circuit C1 to C6 emit evenly and the LED backlight 18 irradiate the liquid crystal panel 16 with even light via the light guide plate 24.

4. Characteristics of Present Embodiment (1) In the light emitting component board group 30 of the present embodiment, the high pressure side connector P and the low pressure side connector Q are arranged on a different end portion of each light emitting component board in the long-side direction. Therefore, the connector (a terminal) of the wiring connected to the high pressure side connector P and the connector (a terminal) of the wiring connected to the low pressure side connector Q have a predetermined potential difference. Therefore, wiring problems such as short out are less likely to occur.

(2) In the light emitting component board group 30 of the present embodiment, as the first closed circuit H1 is explained, the loop area of each closed circuit H1 to H3 is reduced to be small. Therefore, noise occurring in the closed circuits H1 to H3 is less likely to be caused and deterioration of the light emission condition of the LEDs 20 included in the LED groups L1 to L6 is less likely to be caused.

(3) According to the light emitting component board group 30 of the present embodiment, each of the first closed circuit H1 and the third closed circuit H3 is configured with the first light emitting component board 36, and each of the first closed circuit H1 and the second closed circuit H2 is configured with the second light emitting component board 38. This reduces the number of light emitting component boards required for configuring the LED backlight 18 with using a plurality of closed circuits H.

(4) According to the light emitting component group 30 of the present embodiment, substantially a same voltage is applied to the terminal connected to each of the high pressure side connectors P2, P3 of the second light emitting component board 38. The high pressure side connectors P2, P3 are arranged on the same short side of the second light emitting component board 38. Therefore, the wiring connected to the high pressure side connector P2 and the wiring connected to the high pressure side connector P3 are likely to short out due to tracking. In the light emitting component board group 30 of the present embodiment, substantially a same voltage is applied to the terminals each connected to each of the high pressure side connectors P2, P3. Therefore, even if the terminals short out, deterioration of the light emission condition such as flicker of the LEDs 20 and fire are less likely to occur. Such effects are also obtained in the low pressure side connectors Q1, Q4 of the first light emitting component board 36.

Second Embodiment

Figure 3:
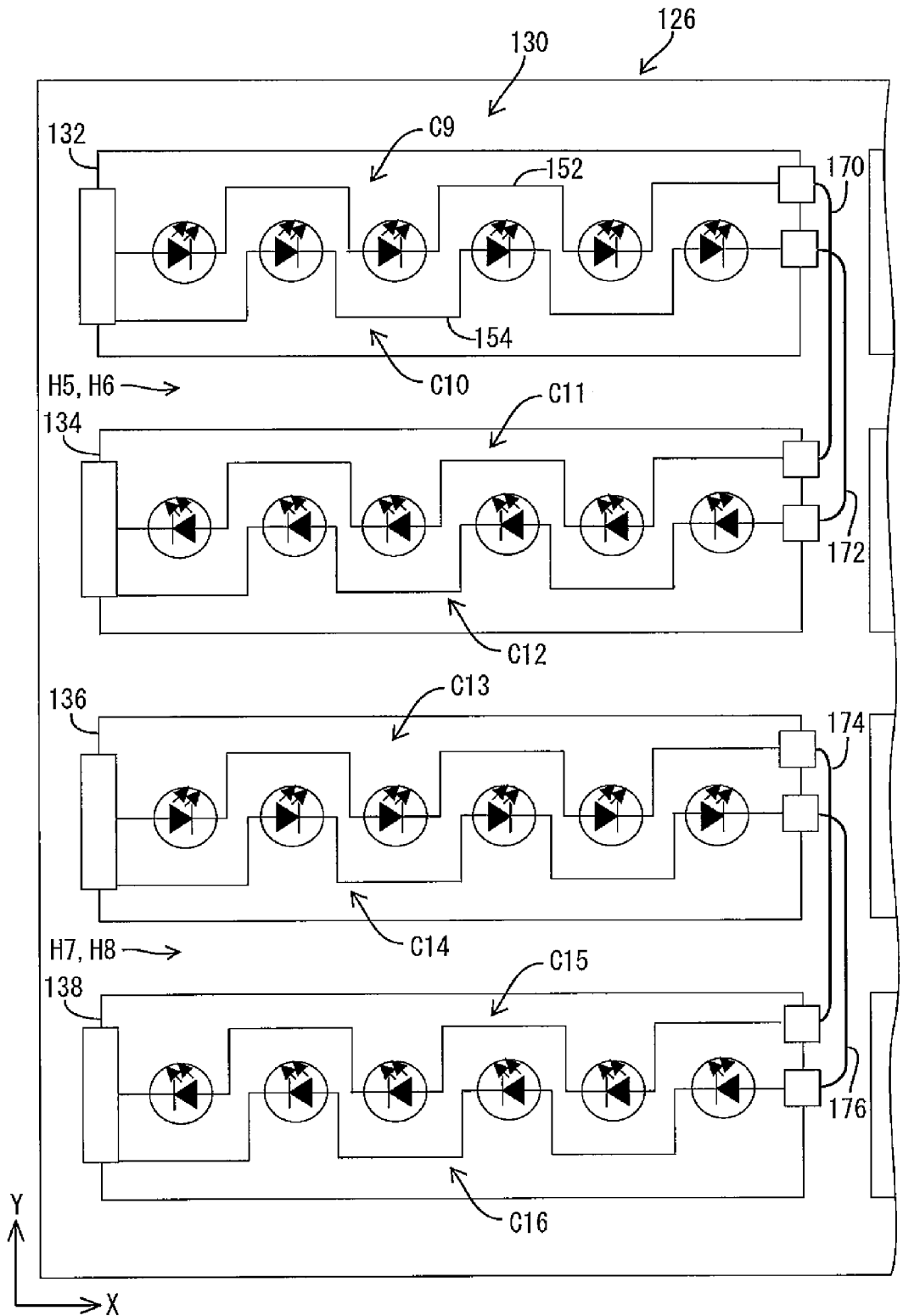
FIG. 3 is a view illustrating a configuration of a backlight driver 126.

FIG. 3 illustrates a backlight driver 126 of the liquid crystal display device 10 according to a second embodiment. The backlight driver 126 of the present embodiment includes a light emitting component board group 130 including light emitting component boards 132 to 138. The LEDs 20 are arranged on each of the light emitting component board linearly along the long-side direction of the light emitting component board. The LEDs 20 are connected alternately by a wiring 152 and a wiring 154.

In the backlight driver 126 of the present embodiment, a eleventh light emitting component board 132 includes a ninth circuit C9 and a tenth circuit C10, and a twelfth light emitting component board 134 includes an eleventh circuit C11 and a twelfth circuit C12. The ninth circuit C9 is connected to the eleventh circuit C11 by a cable 170, and the ninth circuit C9, the cable 170, and the eleventh circuit C11 configure a fifth closed circuit H5. The tenth circuit C10 is connected to the twelfth circuit C12 by a cable 172, and the tenth circuit C10, the cable 172, and the twelfth circuit C12 configure a sixth closed circuit H6.

A thirteenth light emitting component board 136 includes a thirteenth circuit C13 and a fourteenth circuit C14, and a fourteenth circuit 138 includes a fifteenth circuit C15 and a sixteenth circuit C16. The thirteenth circuit C13 is connected to the fifteenth circuit C15 by a cable 174, and the thirteenth circuit C13, the cable 174, and the fifteenth circuit C15 configure a seventh closed circuit H7. The fourteenth circuit C14 is connected to the sixteenth circuit C16 by a cable 176, and the fourteenth circuit C14, the cable 176, and the sixteenth circuit C16 configure a eighth closed circuit H8.

In the light emitting component board group 130 of the present embodiment, the eleventh light emitting component board 132 and the twelfth light emitting component board 134 configure the fifth closed circuit H5 and the sixth closed circuit H6, and the thirteenth light emitting component board 136 and the fourteenth light emitting component board 138 configure the seventh closed circuit H7 and the eighth closed circuit H8. Namely, the number of the closed circuits H5 to H8 is equal to the number of the light emitting component boards 132 to 138 that are required to configure the closed circuits H5 to H8. This reduces the number of light emitting component boards required for configuring the closed circuits in the LED backlight 18 that is configured with a plurality of closed circuits H.

Third Embodiment

Figure 4:
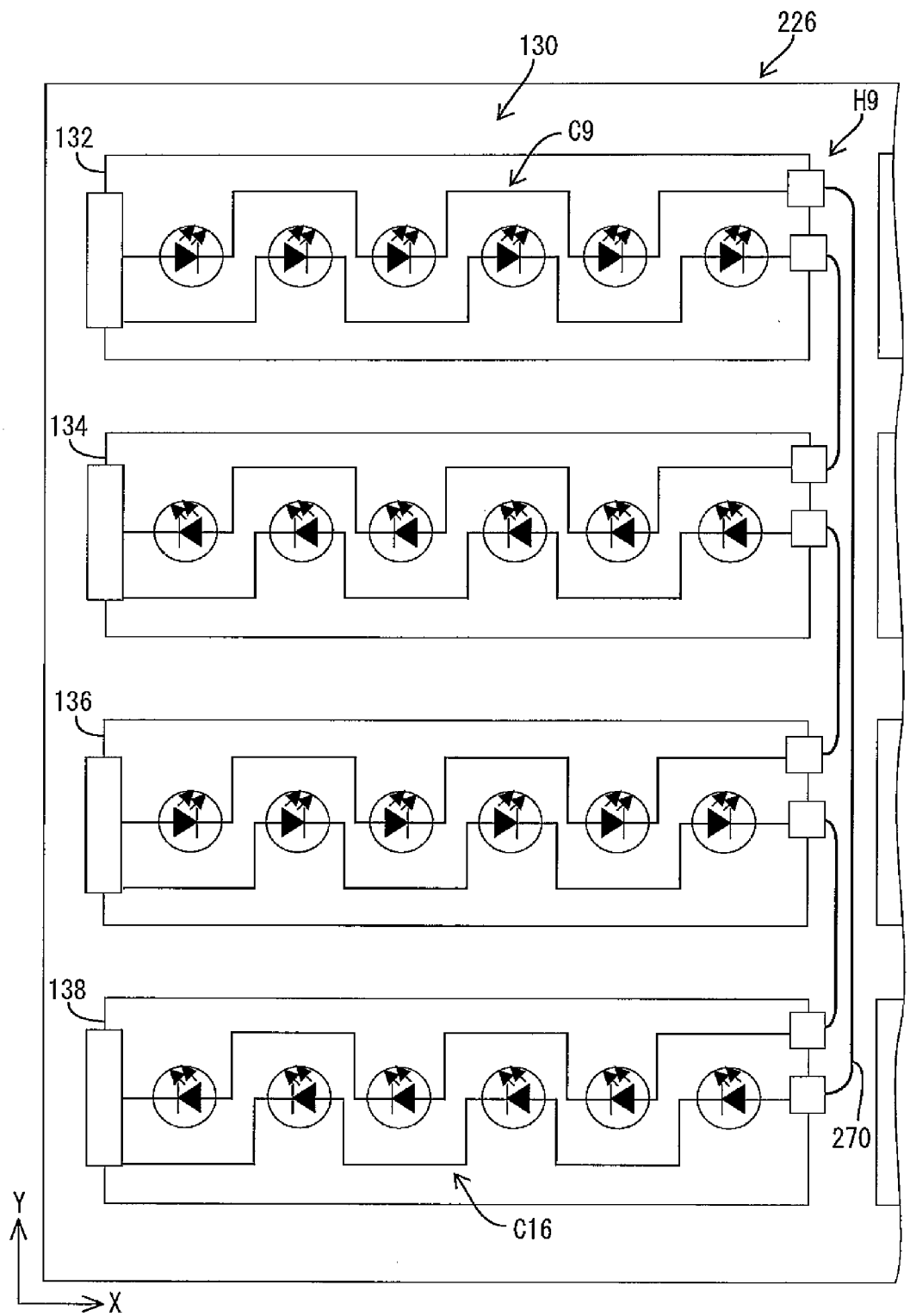
FIG. 4 is a view illustrating a configuration of a backlight driver 226.
Figure 5:
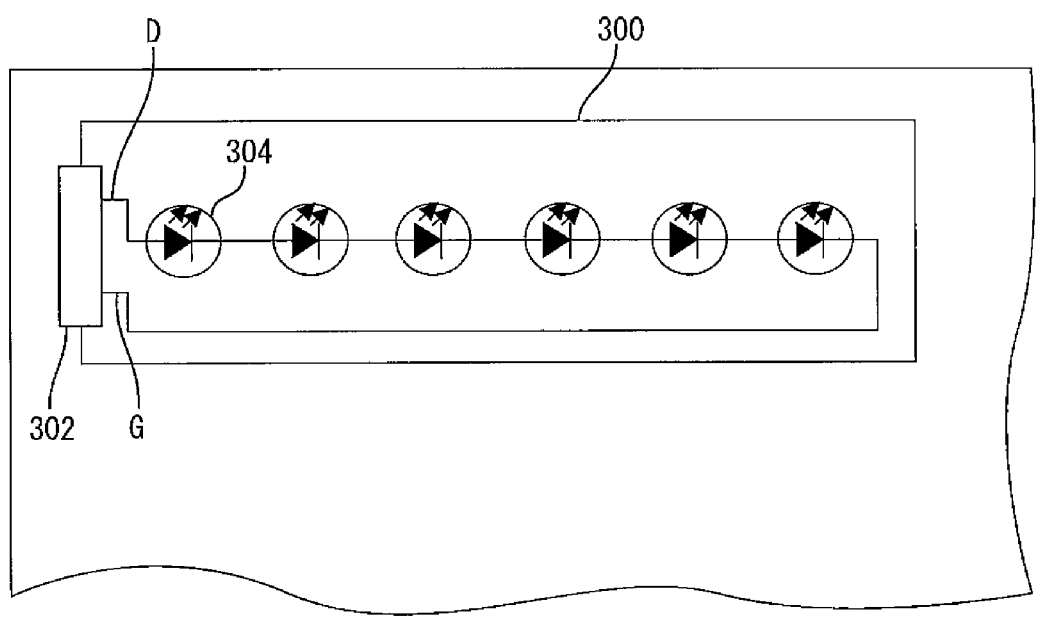
FIG. 5 is a view illustrating a configuration of a light emitting component board 300.
Figure 6:
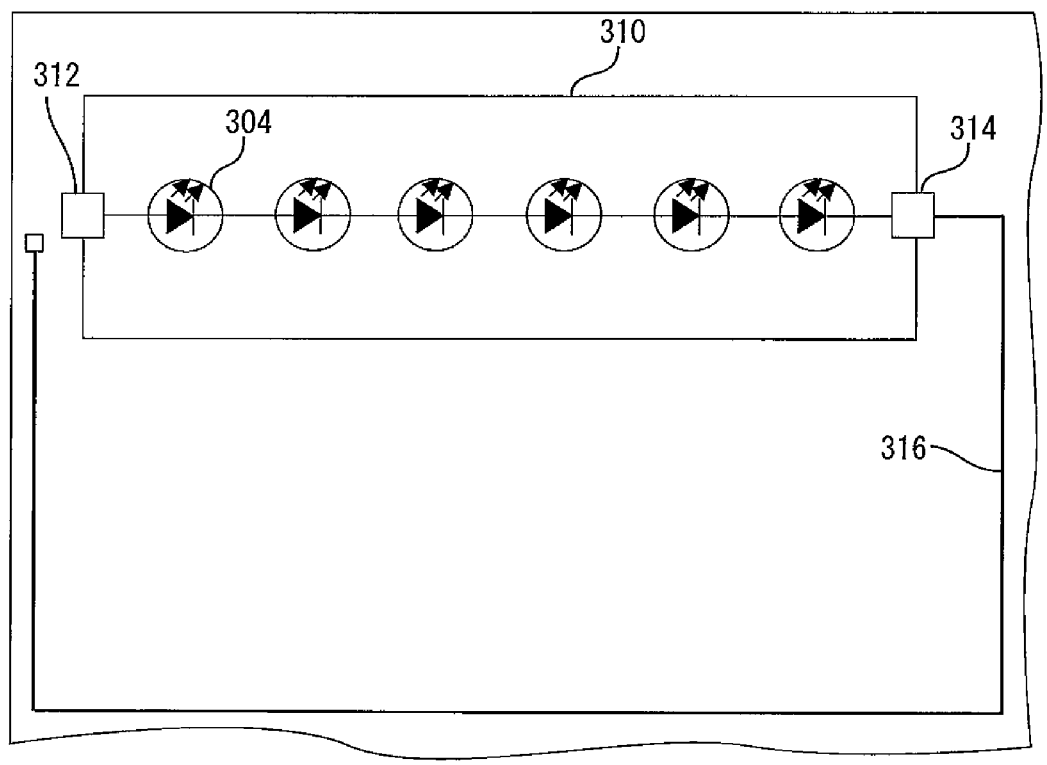
FIG. 6 is a view illustrating a configuration of a light emitting component board 310.

FIG. 4 illustrates a backlight driver 226 of the liquid crystal display device 10 according to the third embodiment. In the backlight driver 226 of the present embodiment, the circuits C are connected to each other in different ways from the backlight driver 126 of the second embodiment. Specifically, the ninth circuit C9 of the eleventh light emitting component board 132 is connected to the sixteenth circuit C16 of the fourteenth light emitting component board 138 by a cable 270. The ninth circuit C9, the cable 270, and the sixteenth circuit C16 configure the ninth closed circuit H9.

In the backlight driver 226 of the present embodiment, a drive voltage applied to the ninth closed circuit H9 is controlled to locally control brightness of the corresponding surroundings of the liquid crystal panel 16 (local dimming). This reduces consumption power.

Other Embodiments

As described above, the embodiment of the present invention has been described. However, the present invention is not limited to the above embodiment described in the above description and the drawings. The following embodiments are also included in the technical scope of the present invention, for example.

In the above embodiments, each circuit C includes a same number of LEDs 20. However, this is not limited thereto. For example, the circuit C including the high pressure side connector P on the right side may include the LEDs 20 in a different number from the LEDs 20 included in the circuit C including the high pressure side connector P on the left side. With this configuration, substantially a same voltage can be applied to each of the wirings connected to the high pressure side connector P and the low pressure side connector Q that are arranged on the same short side of one light emitting component board. Accordingly, change of the light emission condition or fire are less likely to occur.

(2) In the above embodiments, the LED 42 is an example of the light emitting component. However, this is not limited thereto. For example, other light emitting components such as a laser diode may be used.

The technical elements described or shown in the specification or drawings exhibit the technical usefulness individually or in various combination thereof. Furthermore, the technologies illustrated in the specification or drawings realize a plurality of purposes at the same time and have a technical usefulness when one of the purposes is realized.

EXPLANATION OF SYMBOLS

10: Liquid crystal display device
18: LED backlight
20: LED
22: Power source supplier
26: Backlight driver
30: Light emitting component board group
32-40: Light emitting component boards
P: High pressure side connector (Input connector)
Q: Low pressure side connector (Output connector)

H: Closed circuit
L: LED group

The invention claimed is:

1. A light emitting component board group comprising:
a first light emitting component board formed in a rectangular shape having at least two first short sides and at least two first long sides, the first light emitting component board including a first input connector, a first light emitting component group including a plurality of light emitting components, and a first output connector that are connected to each other in this order to configure a first circuit, the first input connector being provided close to one of the first short sides, the first output connector being provided close to another one of the first short sides;
a second light emitting component board formed in a rectangular shape having at least two second short sides and at least two second long sides and arranged in adjacent to the first light emitting component board such that the first long sides and the second long sides are arranged to be substantially parallel to each other, the second light emitting component board including a second output connector, a second light emitting component group including a plurality of light emitting components, and a second input connector that are connected to each other in this order to configure a second circuit, the second output connector being provided close to one of the second short sides that is close to the one of the first short sides, the second input connector being provided close to another one of the second short sides that is close to the other one of the first short sides; and
a fourth light emitting component board formed in the rectangular shape having at least two fourth short sides and at least two fourth long sides and arranged in adjacent to the first light emitting component board such that the fourth long sides and the first long sides are arranged to be substantially parallel to each other;
wherein the first light emitting component board includes a fifth input connector, a fifth light emitting component group including a plurality of light emitting components, and a fifth output connector that are connected to each other in this order to configure a fifth circuit that is insulated from the first circuit and, the fifth input connector is provided close to the one of the first short sides, and the fifth output connector is provided close to the other one of the first short sides,
the fourth light emitting component board includes a sixth output connector, a sixth light emitting component group including a plurality of light emitting components, and a sixth input connector that are connected to each other in this order to configure a sixth circuit, the sixth output connector is provided close to one of the fourth short sides that is close to the one of the first short sides, the sixth input connector is provided on another one of the fourth short sides, and
a first forward voltage drop value of the first light emitting component group is substantially equal to a fifth forward voltage drop value of the fifth light emitting component group, and a second forward voltage drop value of the second light emitting component group is substantially equal to a sixth forward voltage drop value of the sixth light emitting component group.

2. The light emitting component board group according to claim 1, wherein,
the first circuit is arranged on the first light emitting component board close to one of the first long sides that is close to the second light emitting component board, and the second circuit is arranged on the second light emitting component board close to one of the second long sides that is close to the first light emitting component board.

3. The light emitting component board group according to claim 1, further comprising a third light emitting component board formed in the rectangular shape having at least two third short sides and at least two third long sides and provided in adjacent to the second light emitting component board such that the third long sides and the second long sides are arranged to be substantially parallel to each other, wherein
the second light emitting component board includes a third output connector, a third light emitting component group including a plurality of light emitting components, and a third input connector that are connected to each other in this order to configure a third circuit that is insulated from the second circuit, and the third output connector is provided close to the one of the second short sides, and the third input connector is provided close to the other one of the second short sides,
the third light emitting component board includes a fourth input connector, a fourth light emitting component group including a plurality of light emitting components, and a fourth output connector that are connected to each other in this order to configure a fourth circuit, and the fourth input connector is provided close to one of the third short sides close to the one of the second short sides, and the fourth output connector is provided close to another one of the third short sides, and
the first forward voltage drop value of the first light emitting component group is substantially equal to a fourth forward voltage drop value of the fourth light emitting component group, and a second forward voltage drop value of the second light emitting component group is substantially equal to a third forward voltage drop value of the third light emitting component group.

4. The light emitting component board group according to claim 3, wherein the second output connector and the third output connector are configured with one common connector.

5. The light emitting component board group according to claim 3, wherein
the first light emitting component board and the third light emitting component board are configured with one common light emitting component board, and
the first circuit and the fourth circuit are arranged on the common light emitting component board and insulated from each other.

6. The light emitting component board group according to claim 1, wherein the first input connector and the fifth input connector are configured with one common connector.

7. The light emitting component board group according to claim 1, wherein
the second light emitting component board and the fourth light emitting component board are configured with one common light emitting component board, and
the second circuit and the sixth circuit are arranged on the common light emitting component board and insulated from each other.

8. A light emitting device comprising:
the light emitting component board group of claim 1; and
a power source supplier connected to the light emitting component board group and configured to apply a drive voltage to each of the first light emitting component group and the second light emitting component group.

9. The light emitting device according to claim 8, wherein the light emitting components included in each light emitting component group include LEDs.

10. A backlight for a liquid crystal display device comprising the light emitting device according to claim 8.

11. A liquid crystal display device comprising:
a liquid crystal panel configured to display an image; and
the backlight according to claim 10 configured to irradiate the liquid crystal panel with light.

* * * * *